United States Patent
Gladfelter et al.

[11] Patent Number: 6,051,291
[45] Date of Patent: Apr. 18, 2000

[54] HEAT REFLECTIVE SLEEVE WITH INSULATING AIR POCKET

[75] Inventors: Harry F. Gladfelter, Kimberton; Michelle Geib, Philadelphia, both of Pa.

[73] Assignee: Federal-Mogul Systems Protection Group, Inc., Exton, Pa.

[21] Appl. No.: 09/106,296

[22] Filed: Jun. 29, 1998

Related U.S. Application Data

[60] Provisional application No. 60/053,129, Jul. 18, 1997.

[51] Int. Cl.[7] .............................. B29D 22/00; F16L 11/08
[52] U.S. Cl. ..................... 428/34.4; 428/35.2; 428/35.3; 428/35.8; 428/36.1; 428/36.3; 428/36.4; 428/36.91; 428/332; 138/133; 138/134; 138/148; 138/144
[58] Field of Search .................................. 428/36.1, 36.9, 428/35.8, 36.91, 35.9, 35.2, 35.3, 332, 36.4, 36.3, 34.4; 138/115, 133, 134, 148, 144; 124/47

[56] References Cited

U.S. PATENT DOCUMENTS

| | | | |
|---|---|---|---|
| 4,053,667 | 10/1977 | Smith | 138/144 |
| 4,064,355 | 12/1977 | Neroni et al. | 174/47 |
| 4,086,937 | 5/1978 | Hechler, IV | 138/115 |
| 5,538,045 | 7/1996 | Piotrowski et al. | 138/147 |
| 5,849,379 | 12/1998 | Gladfelter et al. | 428/35.8 |

FOREIGN PATENT DOCUMENTS

| | | |
|---|---|---|
| 394117 | 10/1990 | European Pat. Off. . |
| 2004021 | 3/1979 | United Kingdom . |

*Primary Examiner*—Rena L. Dye
*Attorney, Agent, or Firm*—Synnestvedt & Lechner

[57] ABSTRACT

A heat protective sleeve for the protection of elongated members is disclosed, the sleeve having a first sheet of insulative material with an outer reflective layer. Oppositely disposed edges of the first sheet have means for joining the edges to a portion of the first sheet in overlapping relationship to form a tubular sleeve. A second insulative sheet is attached to the outer surface of the first sheet inward from the edges. The second sheet also has a reflective layer on its outer surface and is attached to the first sheet along its edges, parallel to the edges of the first sheet, thus, forming an air pocket between the sheets. A stiff monofilament wire bent into a spiral or other shape is disposed within the air pocket to maintain the pocket shape. In use, the air pocket is positioned facing a heat source and the sleeve interposes a reflective layer, an insulating layer, an air pocket, a second reflective layer and a second insulating layer between the elongated members and the heat source.

25 Claims, 3 Drawing Sheets

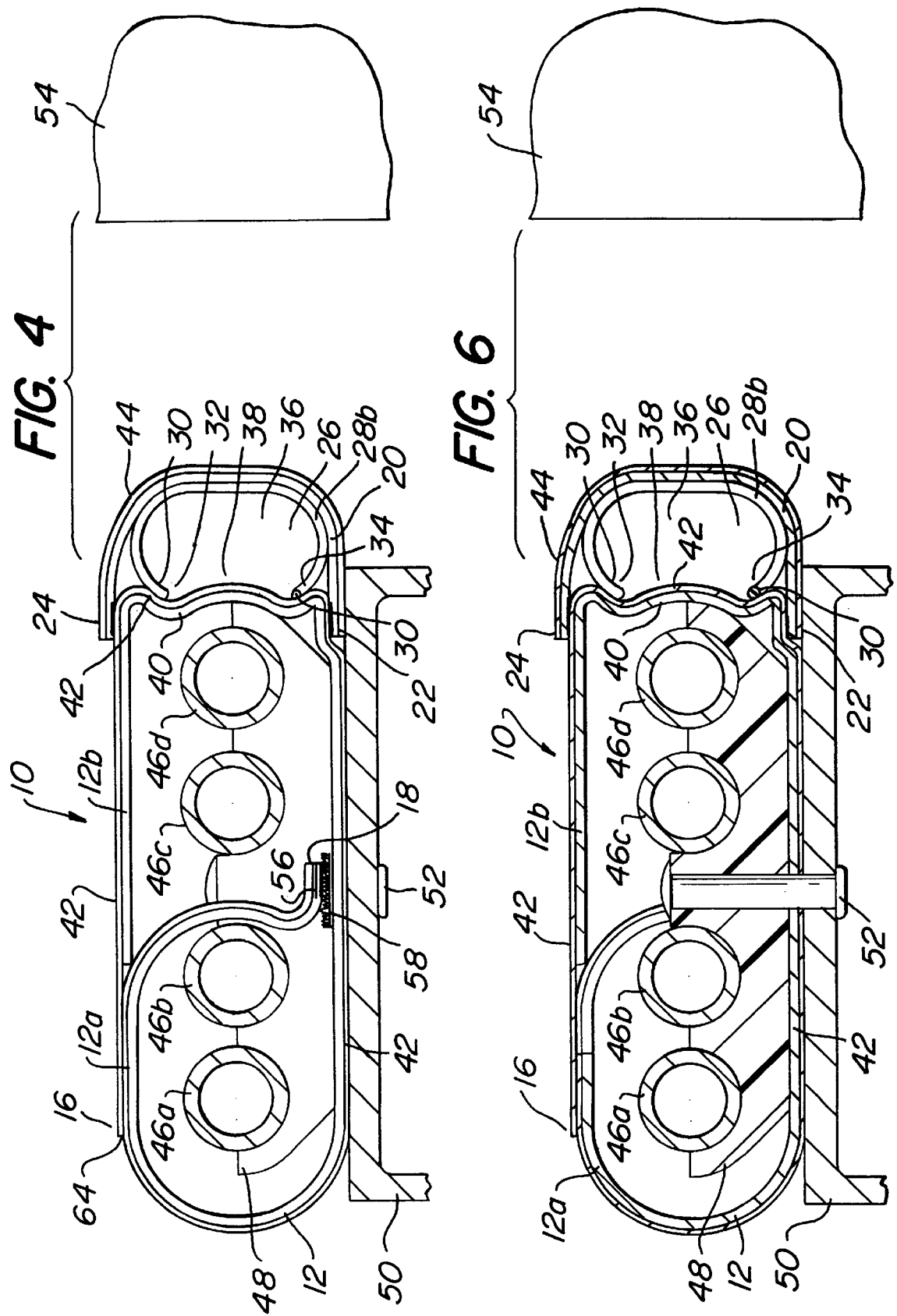

HEAT REFLECTIVE SLEEVE WITH INSULATING AIR POCKET

CROSS-REFERENCE TO RELATED APPLICATION

This application claims the benefit of U.S. Provisional Application No. 60/053,129, filed Jul. 18, 1997.

FIELD OF THE INVENTION

This invention relates to reflective sleeving for thermal insulation of elongated items and especially to insulative sleeving for use, for example, in automotive, train and aircraft applications.

BACKGROUND OF THE INVENTION

Vehicles such as automobiles, trucks, busses, trains and aircraft typically employ internal combustion engines which produce significant heat. Components of an engine, such as the exhaust manifold, catalytic converter and exhaust pipe, can achieve temperatures of several hundred degrees during the normal course of engine operation. These hot components must often be placed in proximity to other components, such as brake lines, electrical wiring or fuel lines, which must remain cool for long-term, effective operation. For example, if unprotected brake lines are located next to the exhaust pipe of an automobile, the brake fluid can be heated and vaporized within the lines. This can lead to a loss of hydraulic pressure and brake failure. Similarly, if unprotected wiring passes near a hot engine component, the electrical insulation could melt and/or ignite, causing an engine fire and an electrical short circuit. If a fuel line is heated sufficiently by an adjacent engine component, gasoline in the line will vaporize leading to a complete or partial interruption of fuel flow to the engine. This is known as vapor lock, and under extreme conditions of vapor lock, the engine will stop or will not start.

Although the problems listed above can often be avoided by keeping hot components sufficiently distant from components which must remain cool, this is not always practical and can lead to more expensive designs and undesirable design tradeoffs. It is, therefore, desirable to provide thermal protection for elongated components, such as brake lines, wiring harnesses, fuel lines and the like, from the consequences of extreme heat of some engine components.

SUMMARY AND OBJECTS OF THE INVENTION

The invention comprises a heat protective sleeve for the protection of elongated components or substrates. The sleeve comprises a first flexible sheet of a thermally insulating material. The first sheet has two oppositely disposed edge portions which are placed in overlapping relationship to form a tubular protective wrap or covering around an elongated component, such as a brake line, which is to be protected from a nearby hot component, such as an exhaust pipe. A second flexible sheet, also made of a thermally insulating material, has oppositely disposed edge portions which are attached to the first flexible sheet inwardly from the first sheet's edge portions. The second sheet is attached to the first sheet along the second sheet's edge portions, allowing a portion of the second sheet to bow outwardly from the first sheet and form an air pocket between the sheets. In order to maintain the separation of the second sheet from the first, a means for forming the air pocket is interposed between the sheets.

The air pocket provides extra insulation and is typically positioned facing the hot component, interposed between it and the component to be insulated.

Preferably, the sheets are woven or knitted from insulative, heat-resistant fibers, such as polyester monofilaments or glass fibers. It is also preferred to provide a reflective layer on the outside surface of the sheets to block thermal radiation from the hot component. For maximum insulating effect, the reflective layer is located on both the outside of the second sheet, as well as on the outside of the first sheet, including that portion of the first sheet within the air pocket which lies beneath the second sheet. A metal foil on the order of 20 microns in thickness provides an effective thermal radiation barrier and yet remains sufficiently flexible to permit manual conformity to a tubular shape. Metalized films may also be employed in some applications.

The air pocket forming means can be a wire form bent to define an open-framed, elongated volume, for example, a monofilament wire formed into a spiral or helical shape. The formed wire is positioned lengthwise along the sleeve within the pocket. The wire is sufficiently stiff so as to maintain its shape, keeping the first and second sheet separated to form the air pocket. The wire is also sufficiently flexible so as to conform to the component around which the sleeve is wrapped.

In a preferred embodiment, the pocket forming means comprises a continuous monofilament member, similarly formed like conventional notebook binder wire, into a multiplicity of spaced apart reverse bends forming a multiplicity of crests and troughs. The continuous monofilament member is further bent in cross section into a C-shaped configuration which positions the crests and troughs at the terminal points of the C-shape. The continuous monofilament member defines an axially extending region with an opening on one side bordered by the crests and troughs. The crests and troughs are arranged against the first flexible sheet within the air pocket.

It is an object of this invention to provide a means for insulating elongated substrates or members.

It is another object of this invention to provide an insulating means having a plurality of reflective layers for blocking radiant heat.

It is yet another object of this invention to provide an insulating means having an insulating air pocket interposed between a heat source and the elongated substrate.

It is again another object of this invention to provide an insulating means which is flexible.

These and other objects will become apparent from a consideration of the following drawings and detailed description of the invention.

BRIEF DESCRIPTION OF THE DRAWINGS

FIG. 4 shows a cross sectional end view of the invention shown in a tubular-shaped configuration around an elongated member adjacent to a heat source;

FIG. 6 shows a cross-sectional view of the invention taken along lines 6—6 of FIG. 5.

DETAILED DESCRIPTION OF A PREFERRED EMBODIMENT

Figure 1:
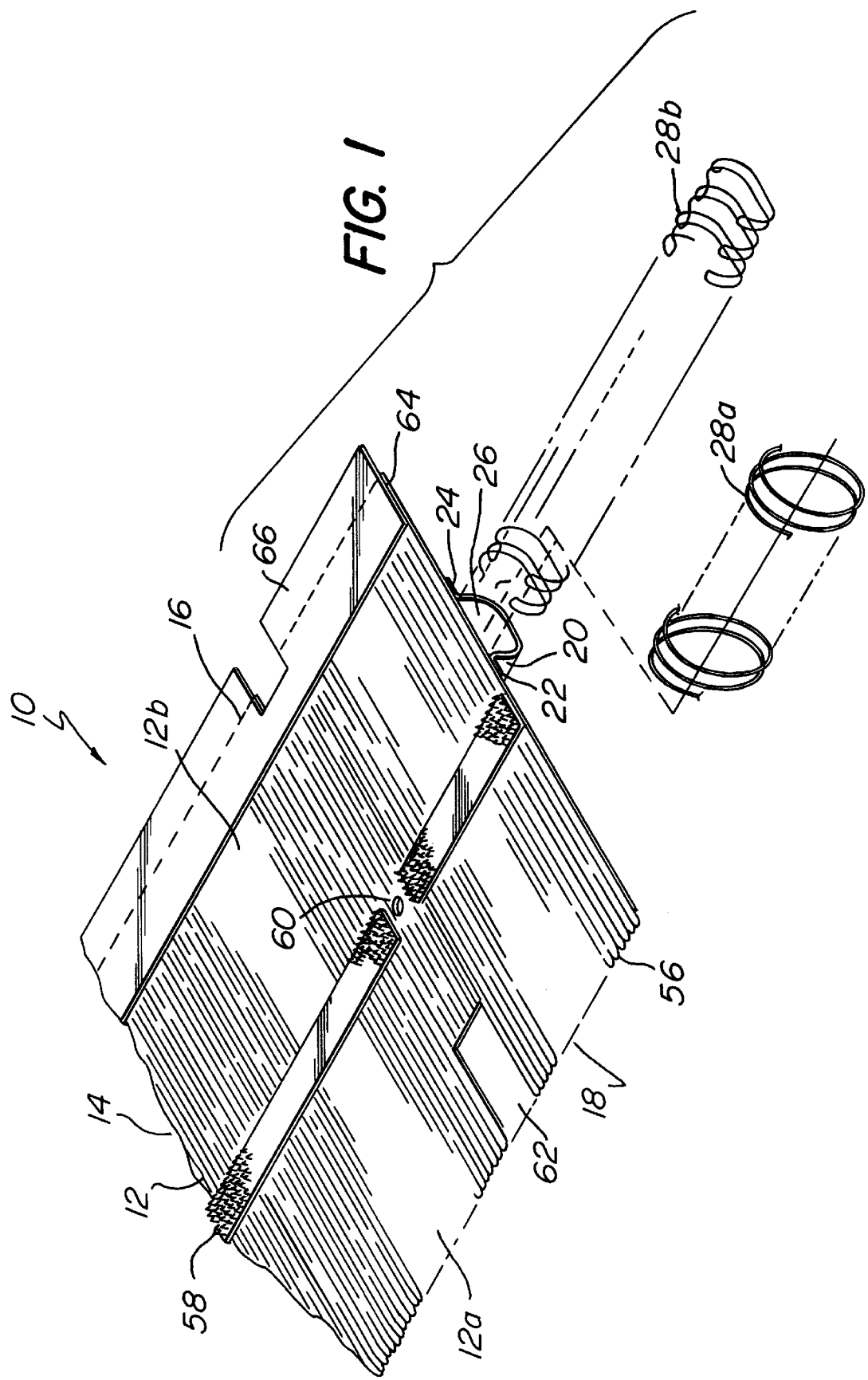
FIG. 1 shows an isometric view of the reflective sleeve wrap with an insulating air pocket according to the invention, the wrap being shown in a flat configuration.

FIG. 1 shows a heat protective sleeve 10 according to the invention which comprises a first flexible sheet of thermally insulating material 12, providing a means formable into an elongated tubular shape. Flexible sheet 12 is woven or knitted, preferably from a polyester monofilament or from glass fiber yarns. Sheet 12 can be formed to any practical length as required to insulate elongated substrates or members, end 14 being shown with an irregular profile to indicate that sheet 12 extends beyond the length shown in FIG. 1.

Sheet 12 has oppositely disposed edge portions 16 and 18 which are placed in overlapping relationship with respective portions of the sheet, as best shown in FIG. 4, to form the tubular protective covering. Each edge 16 and 18 has means for joining the edges to the sheet, described further below.

A second flexible sheet 20 of thermally insulating material has oppositely disposed edge portions 22 and 24 which are attached to sheet 12 and spaced inwardly from edge portions 16 and 18. Edge portions 22 and 24 could be attached by stitching, but it is preferred to bond the edge portions to the sheet. A wide variety of adhesives may be employed, and heat-activated adhesives are preferred. Sheet 20 provides means for forming an air pocket 26 which runs lengthwise along sheet 12.

As seen in FIGS. 1 and 4, a shaped monofilament wire, illustrated as 28a or 28b, is disposed within air pocket 26. The wire comprises means for forming air pocket 26 and serves to space sheet 20 outwardly from sheet 12. The wire provides a flexible skeletal form enveloping an elongated volume and must be sufficiently stiff so as to maintain its shape and thereby the shape of the air pocket, but it must also be sufficiently flexible to allow sleeve 10 to conform to the shape of the elongated member around which the sleeve is wrapped.

Figure 2:
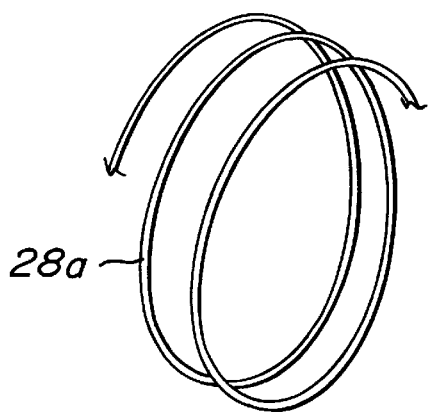
FIG. 2 shows an isometric view of a detail from FIG. 1 on an enlarged scale.

The combination of stiffness and flexibility is achieved by making the wire from a monofilament of a metal, such as steel, formed in a spiral shape, as seen at 28a in FIGS. 1 and 2. The steel spiral provides stiffness and elasticity in the radial direction to maintain the shape of air pocket 26, yet is flexible in bending to allow the sleeve to easily conform to a curvature along the length of the member being insulated.

Figure 3:
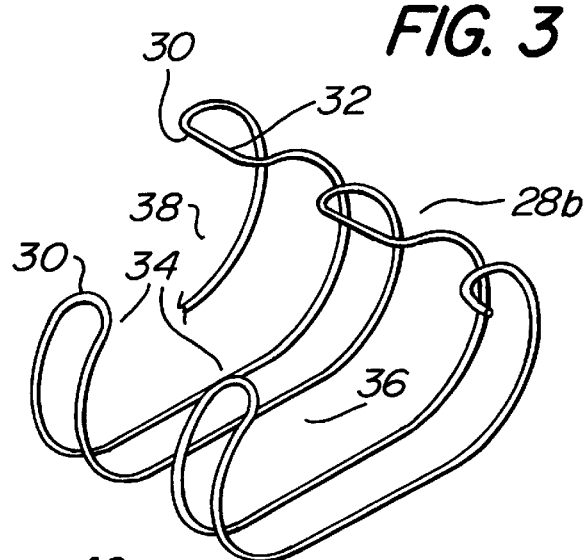
FIG. 3 shows an isometric view of a detail from FIG. 1 on an enlarged scale.
Figure 5:
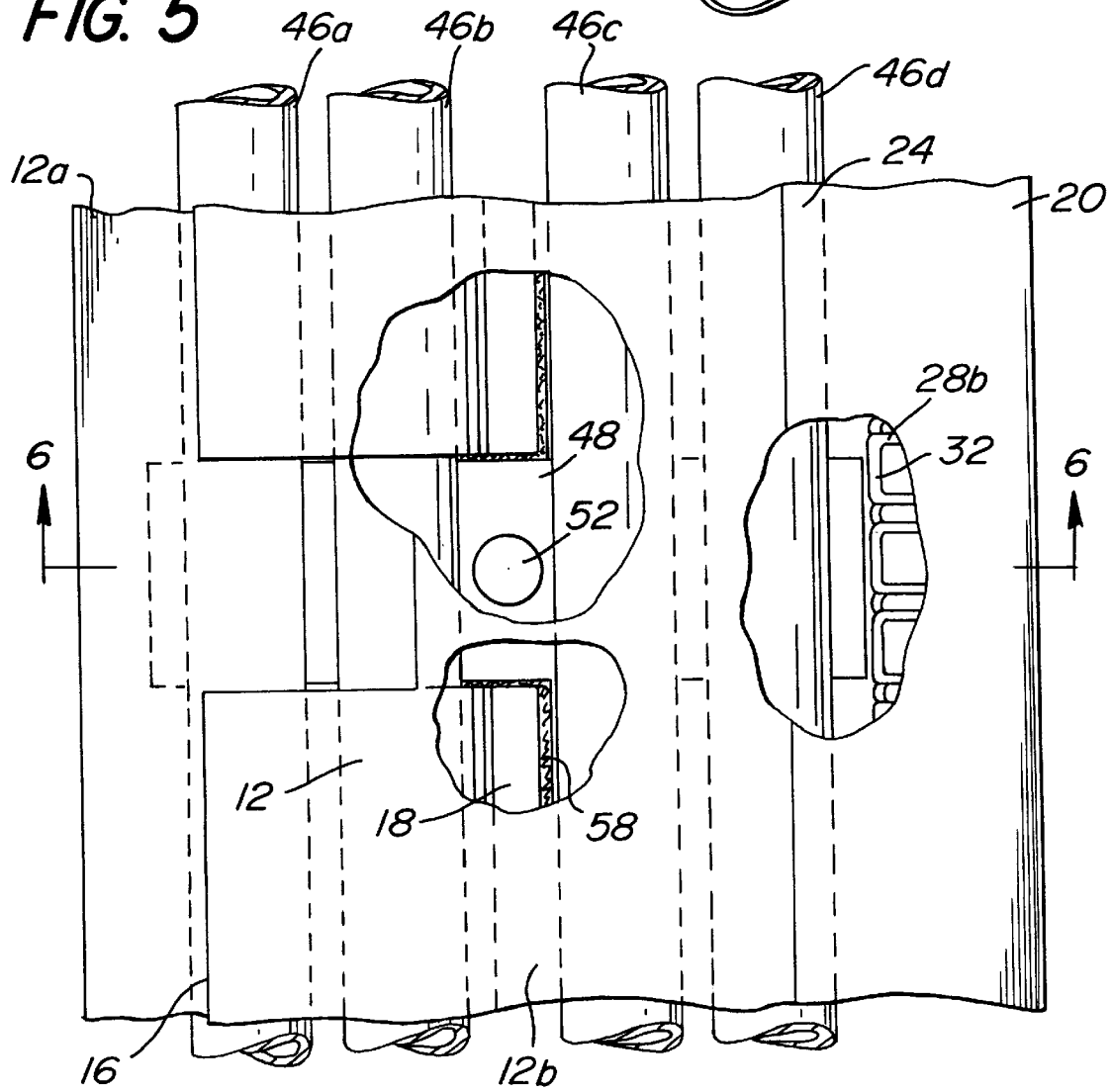
FIG. 5 shows a top plan view of the invention shown in FIG. 4 having cut-away portions showing internal details of the invention.

In a preferred embodiment, illustrated in FIGS. 1 and 3, wire 28b is shown formed into a multiplicity of spaced apart reverse bends 30 forming a multiplicity of crests 32 and troughs 34. The crests and troughs are then further bent into a C-shaped configuration, positioning the crests and troughs adjacent to each other at the terminal points of the C-shape. Wire 28b, thus, defines an axially extending region 36 with an opening 38 on one side bordered by the crests and troughs. Preferably, the crests and troughs are arranged against the first flexible sheet 12 within air pocket 26, as best seen in FIG. 4 and in the cut-away view of FIG. 5. The preferred shape of wire 28b provides a radially rigid form which will maintain the shape of air pocket 26 yet provide longitudinal flexibility and allow the sleeve to conform to an elongated member or substrate. Opening 38 provides a discontinuity to the form of wire 28b which accepts a bulge 40 formed in sheet 12. The opening 38 helps orient wire 28b within air pocket 26 and prevents the wire from rotating within the air pocket and, thus, changing the shape of the pocket.

To prevent radiant heat transfer from the ambient to the inside of sleeve 10, sheets 12 and 20 each have means for reflecting radiant energy in the form of reflective cover layers 42 and 44, respectively (see FIG. 4). The reflective cover layers are positioned on the outside surfaces of the sheets and preferably comprise metal foil approximately 20 microns thick adhered to sheets 12 and 20. The foil is preferably bonded to the sheets with a heat-activated adhesive, although other adhesives are also suitable.

As seen in FIG. 4, sleeve 10 is wrapped around elongated members 46a–46d, which could be brake lines to be insulated by the sleeve. Members 46a–46d are secured in a cradle or clip 48, which is attached to a structure, such as a vehicle frame 50 seen in FIGS. 4 and 6. Clip 48 is attached to frame 50 by fastener means well known in the art, a rivet 52 being shown as an example. A heat source 54, for example, a portion of the exhaust system of the vehicle, is located near brake lines 46a–46d. To prevent the heat from the exhaust system portion 54 from adversely affecting the brake fluid within the brake lines, insulating sleeve 10 is disposed adjacent to the heat source surrounding the brake lines, as described below.

Referring to FIG. 4, sleeve 10 is preferably positioned on frame 50 adjacent to heat source 54 with the reflective layer 42 facing downwardly. Clip 48 is placed on top of sleeve 10 against flexible sheet 12 and fastened in place by rivet 52. Brake lines 46a–46d are positioned in clip 48, and a portion 12a of sheet 12 is folded over adjacent brake lines 46a and 46b bringing edge 18 toward sheet 12. Edge 18 has a plurality of loops 56 arranged along its length on loop tape, loops 56 being engagable with a plurality of hooks 58 formed on hook tape attached to sheet 12 intermediate edges 16 and 18 and extending lengthwise along sleeve 10. As seen in FIG. 1, hooks 58 are not continuous, there being a gap 60 which allows clip 48 to continuously contact sheet 12. As seen in FIG. 4, when interengaged with hooks 58, loops 56 are held securely, thus, holding edge 18 and a portion 12a of sheet 12 in the folded position. Sheet portion 12a has a cut-out 62 which fits around clip 48, allowing loops 56 on edge 18 to engage hooks 58 immediately adjacent to the clip without stretching or distorting sheet 12 around the clip.

Next sheet portion 12b is folded over its adjacent brake lines 46c and 46d, and edge 16 is joined in overlapping relationship to portion 12a of sheet 12. The preferred means for effecting the joint is an adhesive layer 64 which is placed on the underside of reflective layer 42 which extends from sheet 12, as seen in detail in FIGS. 4 and 6. Adhesive layer 64 is covered with release paper 66 which is removed to exposed the adhesive just before the attachment is to be made.

Folding sheet portion 12b positions air pocket 26 facing heat source 54. The air pocket lies between the two reflective layers 42 and 44. This combination of a reflective surface, followed by an air pocket, followed by a second reflective surface, is especially effective at blocking radiant energy from the heat source 54 incident on the sleeve. The outer most reflective layer 44 reflects the majority of the incident radiation. The outer layer will heat up, however, and conductively transfer a portion of the incident heat to underlying sheet 20. Sheet 20 will then radiate energy, which is reflected away from the inside of sleeve 10 by the inner reflective layer 42 on sheet 12. Air pocket 26 separates the reflective layers and inhibits conductive heat transfer between sheet 20 and sheet 12. Together the combination of the reflective layers and the air pocket form an effective insulating barrier between the heat source 54 and the elongated members 46a–46d to be protected. Positioning the air pocket and double-reflective layers facing the heat source places the bulk of the insulative components where they are most needed and enhances the efficiency and effectiveness of the invention.

Insulative sleeves according to the invention provide improved insulating performance over common insulating wraps which have a single non-conducting layer and a single reflective layer. The increased performance is maximized by adjusting the size of the air pocket so that it is sufficiently large to provide an effective heat barrier, yet is not oversized and consequently too close to the heat source, thereby providing undesired increased heat transfer to the elongated members. The sleeve according to the invention is flexible and compact and provides an efficient and economical means of insulating elongated substrates or members such as brake lines, fuel lines or electrical harnessing.

What is claimed is:

1. A heat protective sleeve for the protection of elongated substrates, said sleeve comprising:
    a first flexible sheet of thermal insulating material, said first flexible sheet having first and second oppositely disposed edge portions to be placed in overlapping relationship with a respective portion of said first flexible sheet for forming a tubular protective covering for the elongated substrates;
    a second flexible sheet of thermal insulating material, said second flexible sheet having first and second oppositely disposed edge portions attached to said first flexible sheet at locations on said first flexible sheet spaced inwardly from the oppositely disposed edge portions; and
    means forming an air pocket between said sheets, said air pocket being disposed between said elongated substrate and an outer surface of one of said first and said second flexible sheets when said sleeve is positioned on said elongated substrate.

2. A heat protective sleeve according to claim 1, further comprising a reflective cover layer disposed on said outer surface of said second flexible sheet.

3. A heat protective sleeve according to claim 2, further comprising a reflective cover layer disposed on said outer surface of said first flexible sheet.

4. A heat protective sleeve according to claim 1, wherein said first and second flexible sheets are woven.

5. A heat protective sleeve according to claim 1, wherein said first and second flexible sheets are knitted.

6. A heat protective sleeve according to claim 1, wherein said air pocket forming means comprises a monofilament wire bent into a flexible skeletal form enveloping an elongated volume, said skeletal form being disposed between said first and second sheets against facing surfaces of said sheets thereby supporting said sheets in a spaced-apart relationship forming said air pocket.

7. A heat protective sleeve according to claim 6, wherein said monofilament wire is arranged in a spiral shape having a longitudinal axis arranged lengthwise along said sleeve.

8. A heat protective sleeve according to claim 6, wherein said monofilament wire comprises a continuous member formed into a multiplicity of spaced apart reverse bends forming a multiplicity of crests and troughs, said continuous member being further bent in cross section into a C-shaped configuration positioning said crests and said troughs at the terminal points of said C-shape so that said continuous member defines an axially extending region with an opening on one side bordered by said crests and troughs, said crests and troughs being arranged against said first flexible sheet within said air pocket.

9. A heat protective sleeve according to claim 3, wherein said reflective cover layers comprise metal foil.

10. A heat protective sleeve according to claim 9, wherein said metal foil is approximately 20 microns thick.

11. A heat protective sleeve according to claim 1, wherein one of said first and second flexible sheets comprises a polyester monofilament.

12. A heat protective sleeve according to claim 1, wherein one of said first and second flexible sheets comprises woven glass fiber yarn.

13. A heat protective sleeve according to claim 1, wherein said first and second flexible sheets comprise woven glass fiber yarn.

14. A heat protective sleeve for the protection of elongated members, said sleeve comprising:
    means formable into an elongated tubular shape for flexibly covering the elongated members, said flexible covering means having a means for reflecting radiant energy disposed on the outer surface of said tubular shape;
    means for forming an air pocket arranged lengthwise along said flexible covering means, said sleeve being positionable around said elongated substrate with said air pocket forming means interposed between said elongated substrate and a source of radiant energy outside of said sleeve, said air pocket forming means further comprising a second means for reflecting radiant energy disposed on said air pocket forming means outside of said air pocket; and
    means for spacing said air pocket forming means from said flexible covering means, said spacing means being located within said air pocket between said flexible covering means and said air pocket forming means.

15. A heat protective sleeve according to claim 14, wherein said flexible covering means comprises a flexible sheet of an insulating textile material, said sheet having oppositely disposed edges having means for joining said edges in overlapping relationship with a respective portion of said flexible sheet to form said tubular shape.

16. A heat protective sleeve according to claim 15, wherein said textile material comprises polyester monofilament yarn.

17. A heat protective sleeve according to claim 15, wherein said textile material comprises woven glass fiber yarn.

18. A heat protective sleeve according to claim 14, wherein said means for reflecting radiant energy comprises a metal foil attached to a surface of said flexible covering means.

19. A heat protective sleeve according to claim 14, wherein said air pocket forming means comprises an elongated strip of insulating textile material, said strip having oppositely disposed edges attached lengthwise along said flexible covering means, a region of said strip between said edges being unattached to said flexible covering means and spaced away from said flexible covering means thereby forming said air pocket.

20. A heat protective sleeve according to claim 19, wherein said second means for reflecting radiant energy comprises a metallic foil attached to said strip.

21. A heat protective sleeve according to claim 15, wherein said joining means comprises a layer of adhesive arranged between one of said edges and said respective portion of said flexible sheet in overlapping relationship.

22. A heat protective sleeve according to claim 15, wherein said joining means comprises a plurality of hooks interengagable with a plurality of loops, one of said plurality of hooks and loops being arranged along one of said edges, the other of said plurality of hooks and loops being arranged on said respective portion of said flexible sheet, said tubular shape being formed when said plurality of hooks interengages said plurality of loops.

23. A heat protective sleeve according to claim 14, wherein said flexible covering means and said air pocket forming means comprise a pair of oppositely disposed surfaces and said spacing means comprises a wire form comprised of a metal wire bent in a predetermined shape defining an open framed elongated volume, said wire form bearing against said oppositely disposed surfaces and thereby spacing said air pocket forming means from said flexible covering means.

24. A heat protective sleeve according to claim 23, wherein said wire form means comprises a continuous metal wire monofilament member formed into a multiplicity of spaced apart reverse bends forming a multiplicity of crests and troughs, said continuous monofilament member being further bent in cross section into a C-shaped configuration positioning said crests and said troughs at the terminal points of said C-shape so that said continuous monofilament member defines an axially extending region with an opening on one side bordered by said crests and troughs, said crests and troughs being arranged to bear against said surface comprising said flexible covering means within said air pocket.

25. A heat protective sleeve according to claim 23, wherein said wire form comprises a spiral wire extend lengthwise of said oppositely disposed surfaces.

* * * * *